E. C. DIETRICH & C. W. BLISS.
TROLLEY MECHANISM.
APPLICATION FILED MAR. 19, 1915.
1,222,740.
Patented Apr. 17, 1917.
3 SHEETS—SHEET 2.
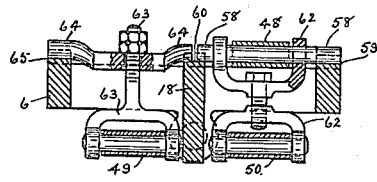
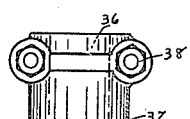
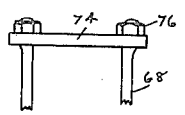
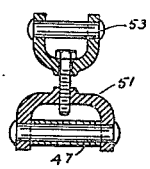
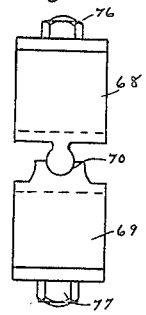
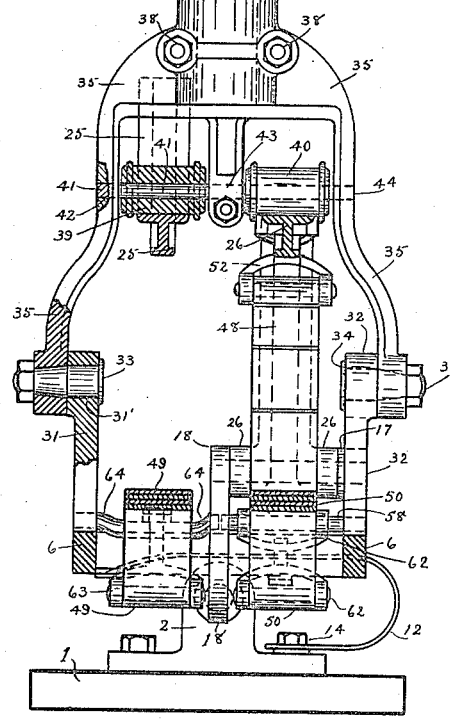
INVENTORS
Edward C. Dietrich
Charles W. Bliss
BY
Louis C. Vanderlip
ATTORNEYS.

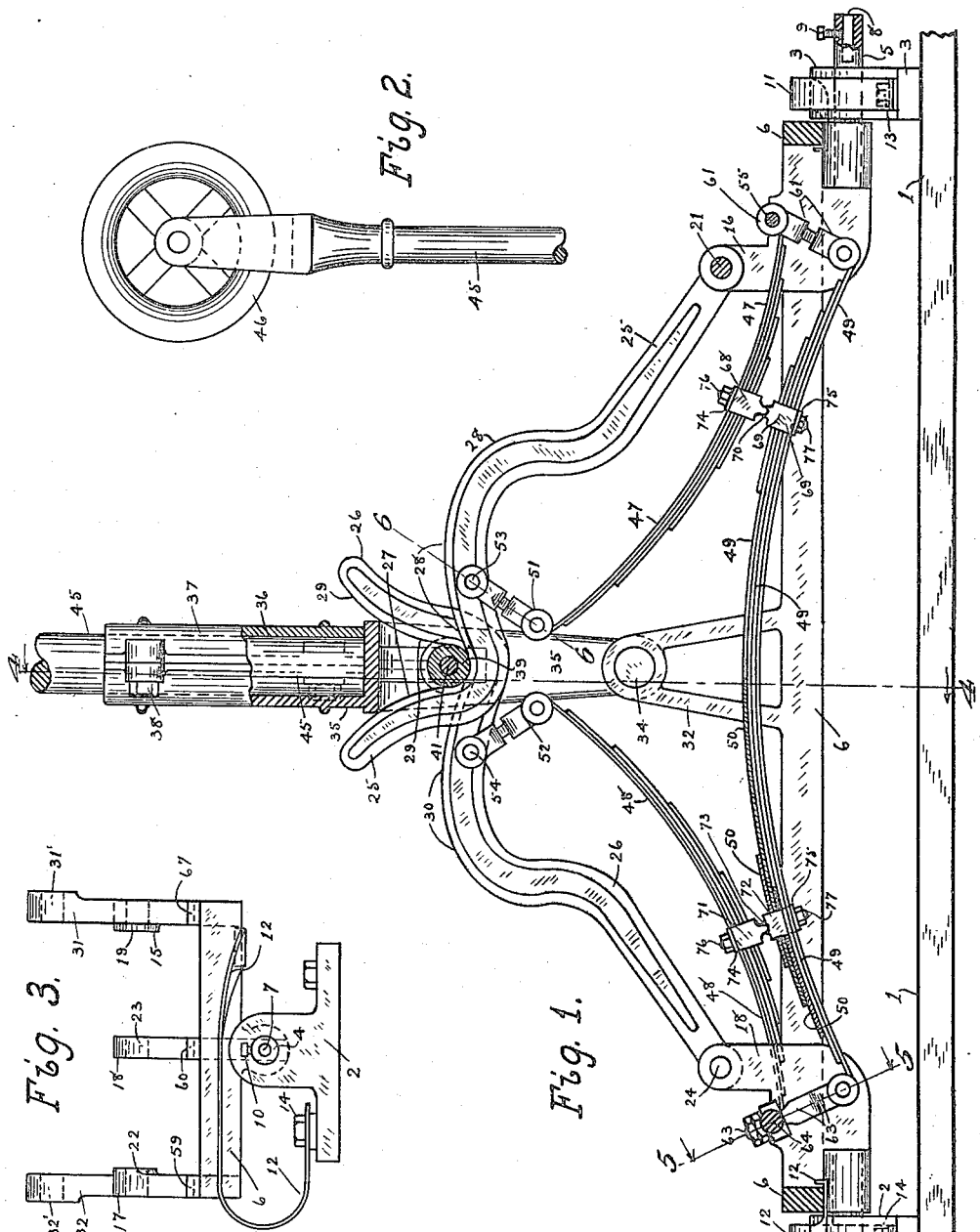

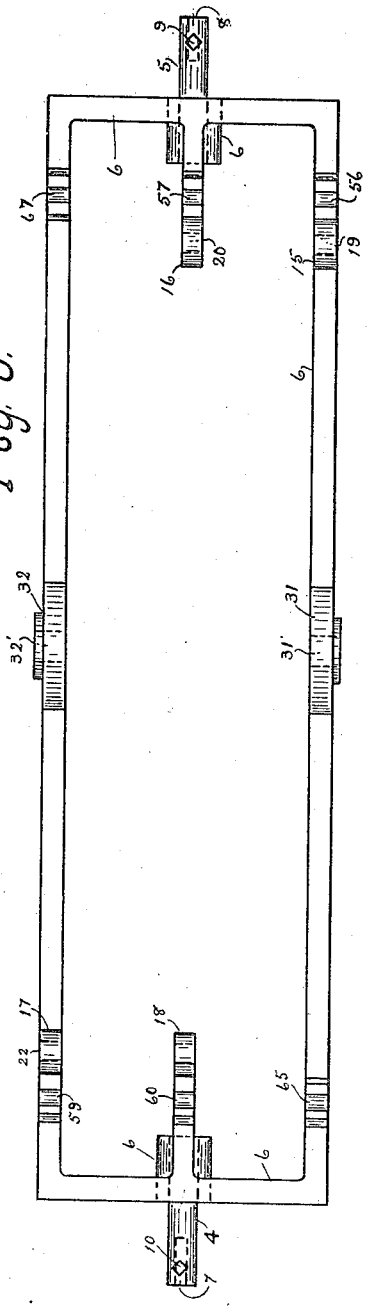
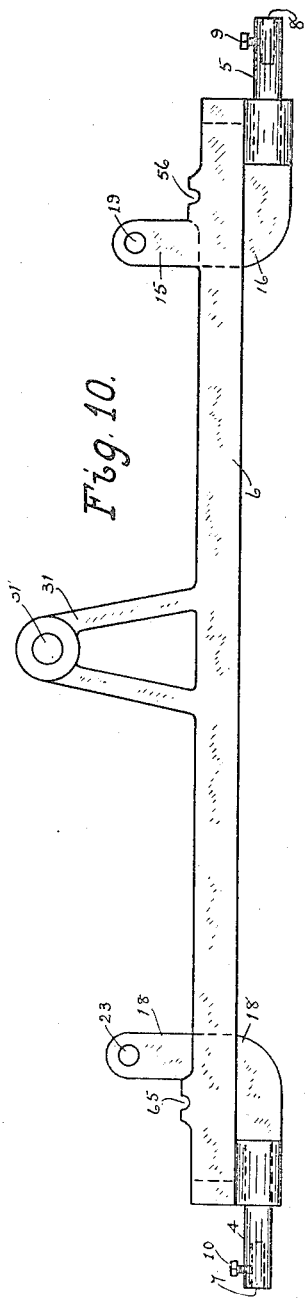

UNITED STATES PATENT OFFICE.

EDWARD C. DIETRICH AND CHARLES W. BLISS, OF SOUTH BEND, INDIANA.

TROLLEY MECHANISM.

1,222,740.

Specification of Letters Patent.

Patented Apr. 17, 1917.

Application filed March 19, 1915. Serial No. 15,417.

*To all whom it may concern:*

Be it known that we, EDWARD C. DIETRICH and CHARLES W. BLISS, citizens of the United States, residing at South Bend, in the county of St. Joseph and State of Indiana, have invented new and useful Improvements in Trolley Mechanism, of which the following is a specification.

Our invention relates to improvements in trolley mechanism, and particularly to improvements on the mechanism shown, described and claimed in the Letters Patent of the United States, issued on January 21st, 1913 to L. R. Barker and E. C. Dietrich, Patent No. 1,050,908.

The objects of our invention are, first, the retention of all the merit and advantages shown and described in said Letters Patent, same being No. 1,050,908, and the improvement thereof to adapt the mechanism to electric trolley cars generally, second, the production of a trolley mechanism which will enable the use of a normally vertical trolley pole which can be swung for ninety degrees, or more, either way, forward or backward, from a vertical position, and third, the production of a trolley mechanism of the kind described in said Letters Patent in which duplicate improved cam levers are used for projecting the trolley pole and carrier into a vertical position.

Our invention enables the production of a trolley mechanism readily operable either forward or backward without disturbing its juxtaposition and in which the trolley pole may be readily swung for more than ninety degrees either way, forward or backward, from a vertical position, either by virtue of the impact of an obstruction or by manual operation.

In the accompanying drawings, Figure 1 is a side elevation of the mechanism with a trolley pole attached; Fig. 2 is a view of the upper end of a trolley pole and wheel; Fig. 3 is an end elevation of the rocker frame, frame support and spring; Fig. 4 is a section on the line 4—4 of Fig. 1; Fig. 5 is a section on the line 5—5 of Fig. 1, showing shackle details; Fig. 6 is a section on the line 6—6 of Fig. 1 through one of the cam lever shackles; Fig. 7 is a side elevation of the spring clips; Fig. 8 is an end view of a spring clip fragment showing the top plate; Fig. 9 is a plan view of the rocker frame; and Fig. 10 is a side elevation of the rocker frame. Similar reference numerals designate similar members and parts of members in the various views.

Referring to the drawings, 1 designates an insulating base member, or board, made of any suitable material, to the ends of which are secured the two frame shaft boxes 2 and 3 which are bored to carry the rotative frame shafts 4 and 5 mounted upon opposite ends of the rocker frame 6. Each of said frame shafts is drilled at 7 and 8, respectively, to receive an electrical connection which is fastened in position by the set screws 9 and 10. Numerals 11 and 12 designate rocker frame springs of flat steel construction secured to the shaft boxes by the spring bolts 13 and 14, the ends of each spring engaging the under side of the rocker frame end with an upward thrust, and adapted, when coöperating from opposite sides of said frame, to maintain the top plane thereof in a horizontal position and to permit of a lateral rocking motion on the horizontal axes of the shafts 4 and 5.

The rocker frame 6 is also adapted to support the entire weight of the trolley pole and its mechanism, as well as to withstand all shocks and strains caused by the trolley pole movements and operation. Numeral 15 designates a cam lever bracket extending upwardly from the side member of the rocker frame 6 adjacent its right hand end, and numeral 16 designates a cam lever bracket extending upwardly from a rocker frame center member and in alinement with bracket 15, both brackets being transversely bored at 19 and 20, respectively, to carry the pivot pin 21 arranged within said bores. Numeral 17 designates a cam lever bracket extending upwardly from the side member of the rocker frame 6 adjacent its left hand end, and 18 designates a cam lever bracket extending upwardly from a rocker frame center member and in alinement with bracket 17, both brackets being bored at 22 and 23, transversely, to carry the pivot pin 24 arranged within said bores.

The numerals 25 and 26 designate duplicate cam levers pivoted, respectively, on pivot pins 21 and 24 carried by said cam lever brackets and freely movable upward and downward thereon. Cam levers 25 and 26 are provided with the curved, or convex, cam faces 27 and 28, and 29 and 30, respectively, upon which faces the cam lever rollers 39 and 40 are adapted to rotate. At about the center of each side member of the rocker frame 6 are provided rocker frame brackets 31 and 32, respectively, oppositely disposed and in alinement with each other, extending upwardly from said frame and transversely bored adjacent their upper ends at 31' and 32', respectively, to carry the bracket pins 33 and 34 which extend laterally therefrom. The numeral 35 designates a trolley pole support forked at its lower end and bored adjacent the extremities of the bifurcation for mounting upon the bracket pins 33 and 34 for forward and backward swinging thereon, and adapted to swing at right angles to the rocking action created at shaft boxes 2 and 3 by the rocker frame 6. The upper end of pole support 35 is provided with a trolley pole socket 36 formed in the body thereof and the union of the body cap 37 therewith secured thereto by the bolts 38.

The numerals 39 and 40 designate cam lever rollers flanged at both ends and longitudinally bored for rotative mounting upon a single roller shaft 41 which is detachably secured to the pole support 35 within the bearing points 42, 43 and 44. The numeral 45 designates the base of a trolley pole, of any suitable form, secured within the socket 36, upon the upper end of which is mounted a rotative trolley wheel 46 adapted to engage a trolley wire, in the usual manner. Semi-elliptic cam lever leaf springs are designated by the numerals 47 and 48 and leaf base springs of semi-elliptic formation by the numerals 49 and 50. The outer end of each cam lever spring is carried by a spring shackle, designated by numerals 51 and 52, respectively, each shackle being pivoted to a cam lever, 25 and 26, respectively, adjacent a point intermediate its medial portion and the outer extremity thereof, and designated by numerals 53 and 54, respectively. The inner end of cam lever spring 47 is carried by the shaft 55 mounted within the shaft half boxes 56 and 57 formed in the upper face of the rocker frame 6 adjacent the bases of cam lever brackets 15 and 16, respectively. And the inner end of cam lever spring 48 is carried by the shaft 58 mounted within the shaft half boxes 59 and 60 formed in the upper face of the rocker frame 6 adjacent the bases of cam lever brackets 17 and 18, respectively. Numeral 61 designates a spring shackle pivotally mounted upon the shaft 55 and adapted to carry one end of the base spring 49. And numeral 62 designates a spring shackle pivotally mounted upon the shaft 58 and adapted to carry one end of the base spring 50. The other end of base spring 49 is carried by the shackle 63 pivotally mounted upon the shaft 64 having its ends pivotally arranged within the half box 60 and half box 65 formed on the side member of frame 6 and in alinement with half box 60. And the other end of base spring 50 is carried by a shackle 65—not shown—but similar in construction and function to shackle 63, mounted upon a pivot shaft 66—not shown—but similar in construction and function to shaft 64 and having its ends pivotally arranged within the half box 57 and half box 67 formed in the side member of rocker frame 6 and in alinement with half box 57.

Numerals 68 and 69 designate adjustable spring clips secured to springs 47 and 49, respectively, and in pivotal engagement with each other in male and female relation at 70. And numerals 71 and 72 designate adjustable spring clips secured to springs 48 and 50, respectively, and in pivotal engagement with each other in male and female relation at 73. Both spring clip sets, 68 and 69, and 71 and 72, are similar in construction and function as shown at Figs. 7 and 8, and each set is provided with clamping plates 74 and 75 and the nuts 76 and 77 in screw threaded relation with each clip body, in the usual manner of spring clip construction.

We show two cam levers, 25 and 26, as the preferred form of our invention, but only one is necessary to the successful and efficient operation thereof, and one is sufficient except in an emergency. If one of the cam levers breaks while the trolley car is in motion the mechanism continues its efficient operation, as the duplicate cam lever, the one remaining unbroken, thereafter performs all of the functions of both levers, again forcing the pole vertically.

Normally the trolley pole is forced to a vertical position and at relatively right angles to the plane of a trolley wire, by the action of the spring pressed cam levers 25 and 26 exerting an upward pressure upon the cam lever rollers 39 and 40. When the trolley pole is forced from a vertical position the cam lever rollers 39 and 40 roll upon the converging convex cam faces 27 and 28 of the cam lever 25 and also upon the converging convex cam faces 29 and 30 of the cam lever 26 according to the direction and extent of deflection from a vertical position.

We claim,

1. In a trolley mechanism, a trolley pole, a bifurcated trolley pole support, a rocker frame provided with fork brackets upon which said forked pole support is pivotally mounted, said rocker frame being provided also with a plurality of cam lever brackets, means for pivotally supporting said rocker frame to enable it to rock on a horizontal axis disposed in a different angle to the trolley pole axis, and resilient means including converging duplicate cam levers pivotally mounted upon said cam lever brackets and actuating said trolley pole for normally swinging the trolley pole to an upright position.

2. In a trolley mechanism, a trolley pole provided with a bifurcated support, a rocker frame provided with fork brackets upon which said bifurcated pole support is pivotally mounted on a horizontal axis, said rocker frame being provided also with cam lever brackets, means for pivotally supporting said rocker frame to enable it to rock on a horizontal axis relatively at right angles to the trolley pole axis, and resilient means including duplicate cam levers pivotally mounted upon said cam lever brackets and duplicate leaf springs adapted to actuate said trolley pole and support for normally swinging said trolley pole on its axis to a vertical position.

3. In a trolley mechanism, a laterally rocking frame provided with medially disposed fork brackets and cam lever brackets adjacent each end, a trolley pole, a bifurcated pole support pivotally mounted upon said fork brackets and adapted to swing either forward or backward from a normally upright position, rollers rotatively mounted upon the pole support, and duplicate converging spring pressed means engaging said rollers adapted to yieldably maintain said trolley pole and support in an upright position.

4. In a trolley mechanism, a trolley pole provided with a bifurcated support, a laterally rocking frame provided with medially disposed fork brackets and cam lever brackets on opposite sides thereof, said bifurcated pole support being pivotally mounted upon said fork brackets and yieldable either way on said pivots from a normally medial position, and resilient means actuating said pole and support for forcing the pole to an upright position, said means comprising duplicate cam levers and resilient members pivotally secured thereto to upwardly project the cam levers into engagement with the pole support.

5. In a trolley mechanism, a trolley pole provided with a forked support, a laterally rocking frame provided with medially disposed fork brackets and cam lever supports on opposite sides thereof, said forked pole support being pivotally mounted upon said fork brackets and yieldable either way on its pivots from a normally upright position, and resilient means engaging the pole support for projecting the pole to an upright position, said means comprising duplicate cam levers and resilient members pivotally secured thereto and adapted to outwardly project the cam levers into engagement with the pole support.

6. In a trolley mechanism, the combination of a rocker frame pivotally mounted at each end and adapted for lateral rocking, means for yieldably retaining the rocker frame in a medial position, a curved face cam lever pivotally mounted upon the rocker frame and adapted to swing at relatively right angles thereto, and a cam lever spring pivotally mounted at both ends thereof one end thereof being carried by said cam lever at a point intermediate the cam lever mounting and its outer extremity, said spring being adapted to outwardly press the cam lever.

7. In a trolley mechanism the combination of a rocker frame pivotally mounted at each end thereof and adapted for lateral rocking, means on the rocker frame for receiving an electrical connection, means mounted upon the frame pivot mounting for yieldably retaining the rocker frame in a medial position, a cam lever pivotally mounted upon the rocker frame, a cam lever spring engaging said cam lever with an upward thrust, said spring having one end thereof mounted upon the rocker frame.

8. In a trolley mechanism the combination of a rocker frame pivotally mounted at each end thereof and adapted for lateral rocking, said frame being provided with cam lever bearings and spring shaft bearings, a cam lever pivotally mounted upon said cam lever bearings, a cam lever spring engaging said cam lever with an upward thrust and having its opposite end mounted upon a spring shaft arranged within said spring shaft bearings, a base spring carried at one end thereof by said spring shaft and having its other end supported by the rocker frame, said base spring being adapted to engage said cam lever spring intermediate its supports.

9. In a trolley mechanism the combination of a rocker frame pivotally mounted at each end thereof and adapted for lateral rocking, a cam lever pivotally mounted upon the rocker frame, a cam lever spring engaging said cam lever and pivotally secured thereto, means engaging the rocker frame for supporting one end of said spring, a base spring having one end thereof supported by said cam lever spring supporting means, said base spring engaging said cam lever spring intermediate its extremities, and means carried by the rocker frame for supporting the other end of said base spring.

10. In a trolley mechanism the combination of a rocker frame pivotally mounted and adapted for lateral rocking, a cam lever pivotally mounted upon the rocker frame, a cam lever spring engaging said cam lever with an upward thrust, means engaging the rocker frame for supporting the opposite end of said spring, a base spring in coöperation with said cam lever spring and having one end thereof supported by said cam lever spring supporting means, the other end of the base spring being otherwise supported, and spring clips mounted upon said base and cam lever springs and engaging each other.

In witness whereof we have hereunto affixed our signatures.

EDWARD C. DIETRICH.
CHARLES W. BLISS.